(12) United States Patent
Lai (10) Patent No.: US 12,534,351 B2
(45) Date of Patent: Jan. 27, 2026

(54) TELESCOPIC CROWBAR

(71) Applicant: TOP MEASURE INSTRUMENT COMPANY, Taichung (TW)

(72) Inventor: Yin-Wu Lai, Taichung (TW)

(73) Assignee: TOP MEASURE INSTRUMENT COMPANY, Taichung (TW)

( * ) Notice: Subject to any disclaimer, the term of this patent is extended or adjusted under 35 U.S.C. 154(b) by 522 days.

(21) Appl. No.: 18/188,752

(22) Filed: Mar. 23, 2023

(65) Prior Publication Data

US 2024/0317561 A1 Sep. 26, 2024

(51) Int. Cl.
*B66F 15/00* (2006.01)
*B25G 1/04* (2006.01)
*B25B 23/00* (2006.01)
*F16B 7/10* (2006.01)

(52) U.S. Cl.
CPC ............ *B66F 15/00* (2013.01); *B25G 1/04* (2013.01); *B25B 23/0021* (2013.01); *F16B 7/105* (2013.01)

(58) Field of Classification Search
CPC .. B25G 1/04; B25G 1/06; F16B 7/105; A47L 9/244; B25B 23/16; B25B 23/0021; B25B 5/068; B25B 5/102; B66F 15/00
USPC ...... 285/303, 320; 248/188.5; 269/149, 207; 254/21
See application file for complete search history.

(56) References Cited

U.S. PATENT DOCUMENTS

| | | | | |
|---|---|---|---|---|
| 3,704,850 | A * | 12/1972 | Hendrickson | A47B 9/20 248/188.5 |
| 6,832,784 | B1 * | 12/2004 | Chen | A47L 9/244 285/320 |
| 7,516,988 | B2 * | 4/2009 | Lin | A47L 9/244 285/302 |
| 8,388,254 | B2 * | 3/2013 | Huang | F16B 7/105 403/109.1 |
| 8,684,620 | B2 * | 4/2014 | Lin | B25G 1/04 81/177.2 |
| 10,351,403 | B2 | 7/2019 | Jackson et al. | |
| 2014/0145127 | A1 * | 5/2014 | Su | B25G 1/04 254/129 |
| 2018/0117752 | A1 * | 5/2018 | Weber | B25G 3/20 |
| 2020/0156235 | A1 * | 5/2020 | Su | B25G 1/06 |
| 2021/0162576 | A1 * | 6/2021 | Su | B25B 23/0021 |

FOREIGN PATENT DOCUMENTS

| | | | | |
|---|---|---|---|---|
| CN | 110723698 | A * | 1/2020 | ............ B66F 15/00 |
| CN | 111195884 | A | 5/2020 | |
| TW | M644109 | U | 7/2023 | |

* cited by examiner

*Primary Examiner* — Mahdi H Nejad (57) ABSTRACT

A telescopic crowbar has a mounting sleeve, an adjusting module, and an extending rod. The adjusting module is connected to the mounting sleeve and has a body, a pressing element, an engaging element, and a returning element. The body is connected to the mounting sleeve and has a limiting recess. The extended rod engages with the adjusting module, extends into the mounting sleeve, and has an inserting end, a working end, and at least two positioning recesses. The at least two positioning recesses are formed on an external surface of the extending rod at a spaced interval between the inserting end and the working end of the extending rod. The engaging element selectively engages with one of the at least two positioning recesses via the limiting recess to hold the extending rod firmly on the mounting sleeve.

8 Claims, 8 Drawing Sheets

TELESCOPIC CROWBAR

BACKGROUND OF THE INVENTION

1. Field of the Invention

The present invention relates to a crowbar, and more particularly to a telescopic crowbar with a simple structure and can be used and adjusted easily.

2. Description of Related Art

A conventional crowbar is used to separate two combined objects to remove nails from an object, is a rod made of metal, and has an operating portion and a holding portion. The operating portion is curved and is formed on one of two ends of the conventional crowbar. The holding portion is formed on another one of the two ends of the conventional crowbar for holding by a user. The user can hold the holding portion of the conventional crowbar and separate the two combined objects or remove the nails from the object by the operating portion of the conventional crowbar.

Although the conventional crowbar can be used to separate the two combined objects or remove the nails, the conventional crowbar has a fixed length and cannot be adjusted. When a distance between the user and the two combined objects or nails is longer than the fixed length of the conventional crowbar, the user cannot use the conventional crowbar to separate the two combined objects or remove the nails and needs to buy or use another crowbar of a different size, this increases the cost of using the conventional crowbar, and the conventional crowbar cannot be adjusted according to the actual situation, relatively limiting the practicability of the conventional crowbar.

To overcome the shortcomings, the present invention provides a telescopic crowbar to mitigate or obviate the aforementioned problems.

SUMMARY OF THE INVENTION

The main objective of the present invention is to provide a telescopic crowbar with a simple structure and can be used and adjusted easily.

The telescopic crowbar in accordance with the present invention has a mounting sleeve, an adjusting module, and an extending rod. The adjusting module is connected to the mounting sleeve and has a body, a pressing element, an engaging element, and a returning element. The body is connected to the mounting sleeve and has a limiting recess. The extended rod engages with the adjusting module, extends into the mounting sleeve, and has an inserting end, a working end, and at least two positioning recesses. The at least two positioning recesses are formed on an external surface of the extending rod at a spaced interval between the inserting end and the working end of the extending rod. The engaging element selectively engages with one of the at least two positioning recesses via the limiting recess to hold the extending rod firmly on the mounting sleeve.

Other objectives, advantages and novel features of the invention will become more apparent from the following detailed description when taken in conjunction with the accompanying drawings.

DETAILED DESCRIPTION OF THE PREFERRED EMBODIMENT

With reference to FIGS. 1 to 4, a telescopic crowbar in accordance with the present invention has a mounting sleeve 10, an adjusting module 20, and an extending rod 30.

The mounting sleeve 10 is a hollow tube and has a through end 11, a connecting end 12, and a mounting recess 13. The through end 11 and the connecting end 12 are respectively formed on two ends of the mounting sleeve 10. The mounting recess 13 is formed in the mounting sleeve 10 and communicates with the through end 11 and the connecting end 12 of the mounting sleeve 10. Furthermore, the mounting sleeve 10 has a holding portion 14 being enlarged and formed on the mounting sleeve 10 adjacent to the connecting end 12 of the mounting sleeve 10. Then an inner diameter at the connecting end 12 of the mounting sleeve 10 is larger than an inner diameter at the through end 11 of the mounting sleeve 10.

The adjusting module 20 is connected to the mounting sleeve 10 and has a body 21, a pressing element 22, an engaging element 23, and a returning element 24. The body 21 is cylindrical, is securely connected to the connecting end 12 of the mounting sleeve 10, and has a limiting recess 211. The limiting recess 211 is axially formed through the body 211 and communicates with the mounting recess 13 via the connecting end of the mounting sleeve 12. Preferably, the body 21 has a connecting tube 212 axially formed on and protruded from a lower end of the body 21, extended into the mounting recess 13 and securely connected to the connecting end 12 of the mounting sleeve 10. Then the body 21 is securely connected to the connecting end 12 of the mounting sleeve 10.

The pressing element 22 is swingably disposed on an external surface of the body 21 and has a pivot portion 221, a holding end 222, and a pressing end 223. The pivot portion 221 is formed on a middle of the pressing element 22 and is pivotally connected to the body 21 to enable two ends of the pressing element 22 to swing relative to the body 21 and to move toward or away from the body 21. The holding end 222 and the pressing end 223 are respectively formed on the two ends of the pressing element 22, and the holding end 222 and the pressing end 223 can be moved toward or away from the body 21 as a seesaw with the pivot portion 221 as a fulcrum. Furthermore, an angle is formed between the pressing end and the pivot portion 221 to enable a user to press the pressing element 22 conveniently in a labor-saving way. In addition, the pressing element 22 has an engaging slot 224 formed in the holding end 222, and the pivot portion 221 has two pivot slices 225 formed on the pivot portion 221 at a spaced interval and faced to each other. The pressing element 22 has a pivot rod 226 connected to the body 21 and passed through the two pivot slices 225 to hold the pressing element 22 firmly on the external surface of the body 21.

The engaging element 23 is connected to the pressing element 22 and extends into the limiting recess 211 of the body 21. The engaging element 23 can be extended into or out of the limiting recess 211 of the body 21 as the pressing element 22 is swung relative to the body 21. Furthermore, the engaging element 23 has an engaging end 231 and a limiting end 232 respectively formed on two ends of the engaging element 23, the engaging end 231 engages with the pressing element 22 in the engaging slot 224, and the limiting end 232 extends into the limiting recess 211 of the body 21. The returning element 24 is disposed between the body 21 and the pressing element 22 to provide an effect that the pressing element 22 can return to an original position after being pressed. Furthermore, the returning element 24 abuts against the pressing end 223 of the pressing element 22.

Preferably, the body 21 has a mounting seat 25 formed on and protruded from the external surface of the body 21, and the mounting seat 25 has a mounting slot 251, a pivot hole 252, a through hole 253, and a storage recess 254. The mounting slot 251 is formed in the mounting seat 25. The pivot hole 252 is transversally formed through two outer sidewalls of the mounting seat 25 and communicates with the mounting slot 251. The pivot rod 226 of the pressing element 22 extends through the two pivot slices 225 and the pivot hole 252 to hold the pressing element 22 in the mounting slot 251 of the mounting seat 25. The through hole 253 is radially formed through the mounting seat 25 and the body 21 to communicate with the limiting recess 211. The limiting end 232 of the engaging element 23 extends into the limiting recess 211 via the through hole 253 of the mounting seat 25. The storage recess 254 is formed in the mounting seat 25 and communicates with the mounting slot 251. The returning element 24 is disposed in the storage recess 254 of the mounting seat 25.

The extending rod 30 engages with the adjusting module 20, extends into the mounting sleeve 10, and has an inserting end 31, a working end 32, and at least two positioning recesses 33. The inserting end 31 and the working end 32 are respectively formed on two ends of the extending rod 30, the inserting end 31 extends into the mounting recess 13 of the mounting sleeve 10 via the limiting recess 211 of the body 21 and the connecting end 12 of the mounting sleeve 10, and the working end 32 is disposed out of the mounting sleeve 10 and has a crowbar head 34. The at least two positioning recesses 33 are formed on an external surface of the extending rod 30 at a spaced interval between the inserting end 31 and the working end 32 of the extending rod 30. The engaging element 23 of the adjusting module 20 selectively engages with one of the at least two positioning recesses 33 via the limiting recess 211 to hold the extending rod 30 firmly on the mounting sleeve 10. A position of the extending rod 30 relative to the mounting sleeve 10 can be adjusted by the engaging element 23 engaging with another one of the at least two positioning recesses 33, and a total length of the telescopic crowbar can be adjusted.

Figure 1:
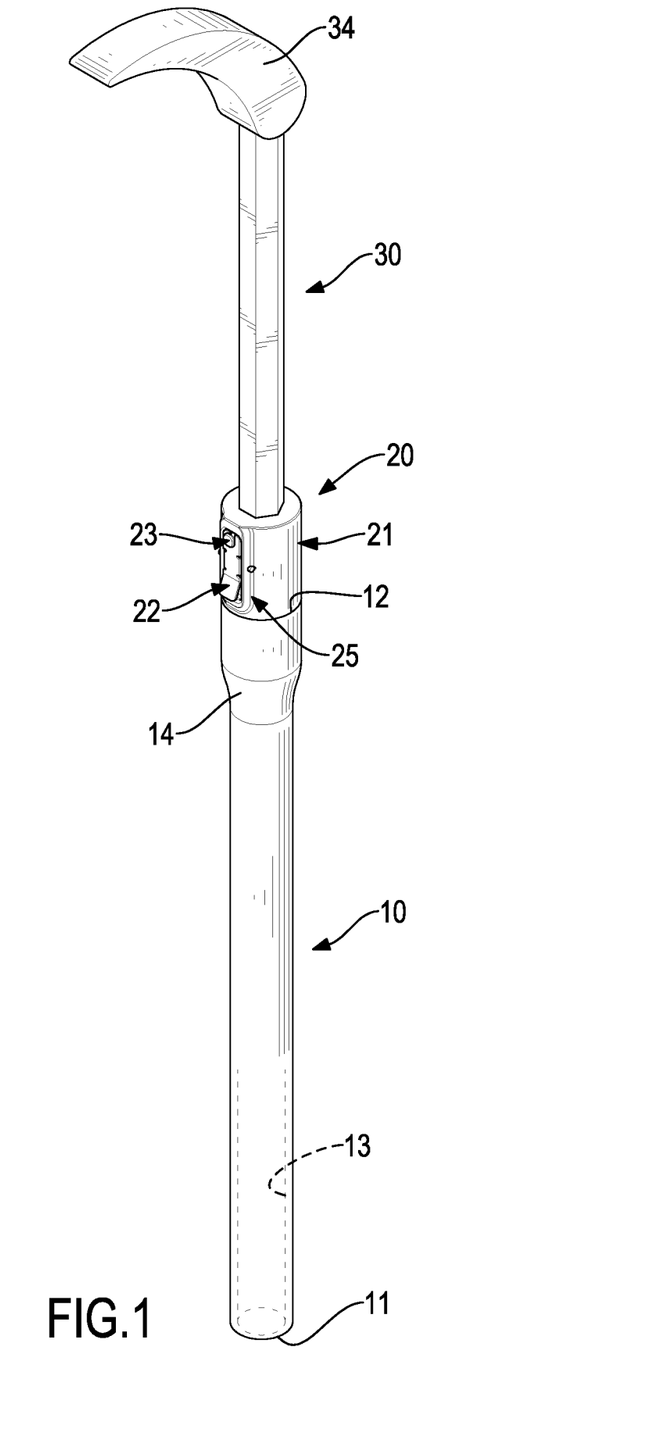
FIG. 1 is a perspective view of a telescopic crowbar in accordance with the present invention.
Figure 2:
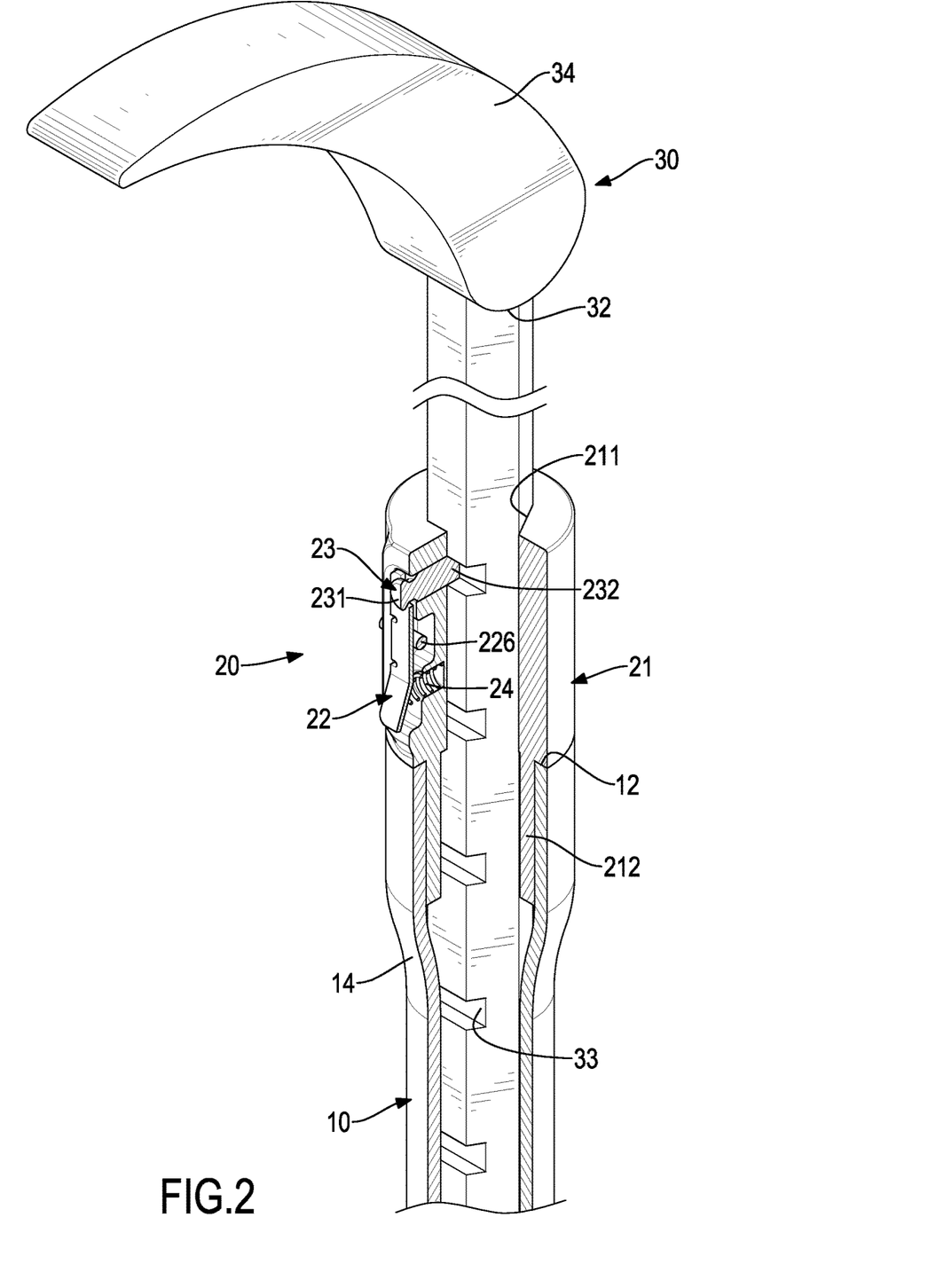
FIG. 2 is an enlarged perspective view in partial section of the telescopic crowbar in FIG. 1.
Figure 3:
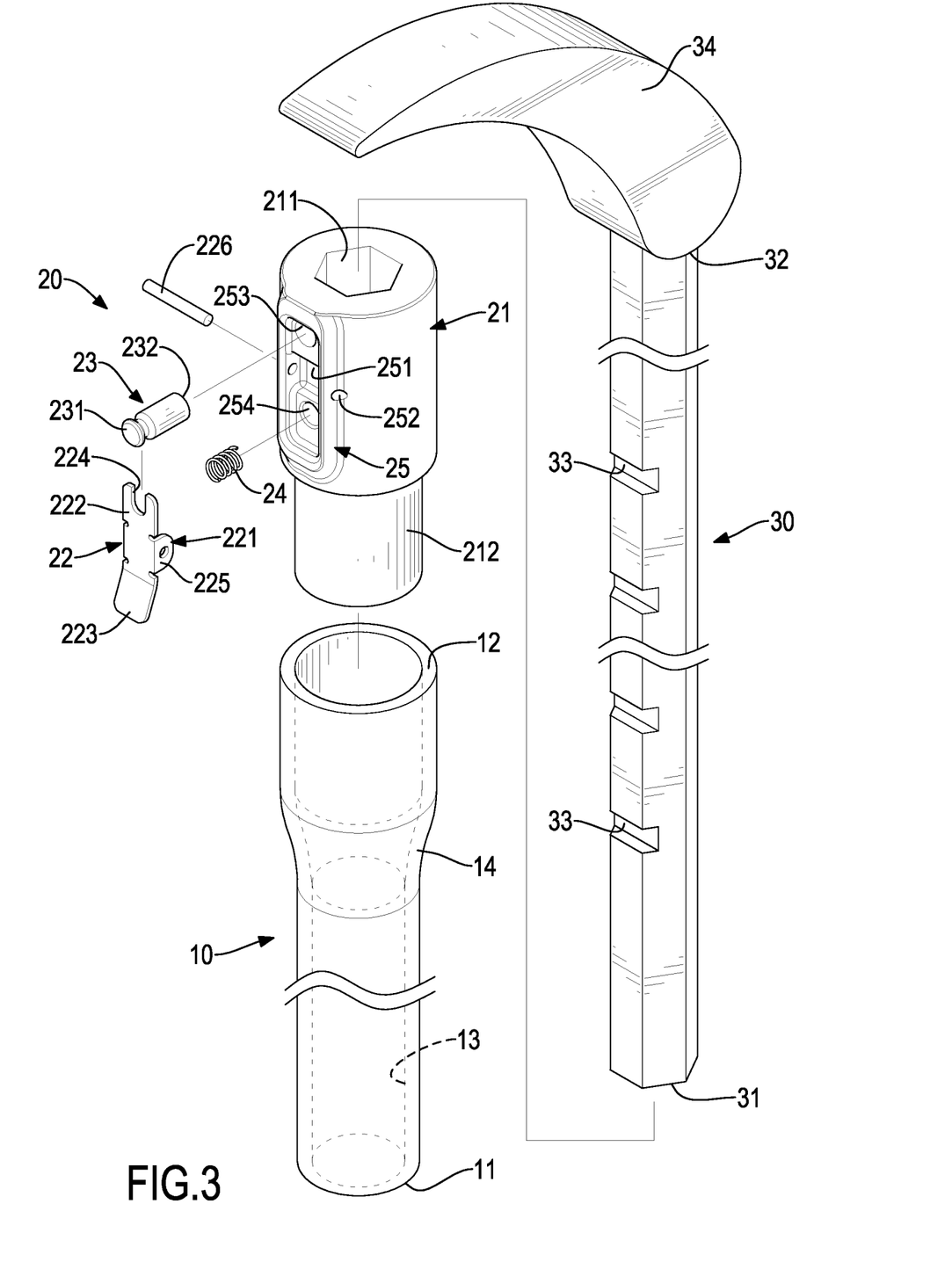
FIG. 3 is an enlarged and exploded perspective view of the telescopic crowbar in FIG. 1.
Figure 4:
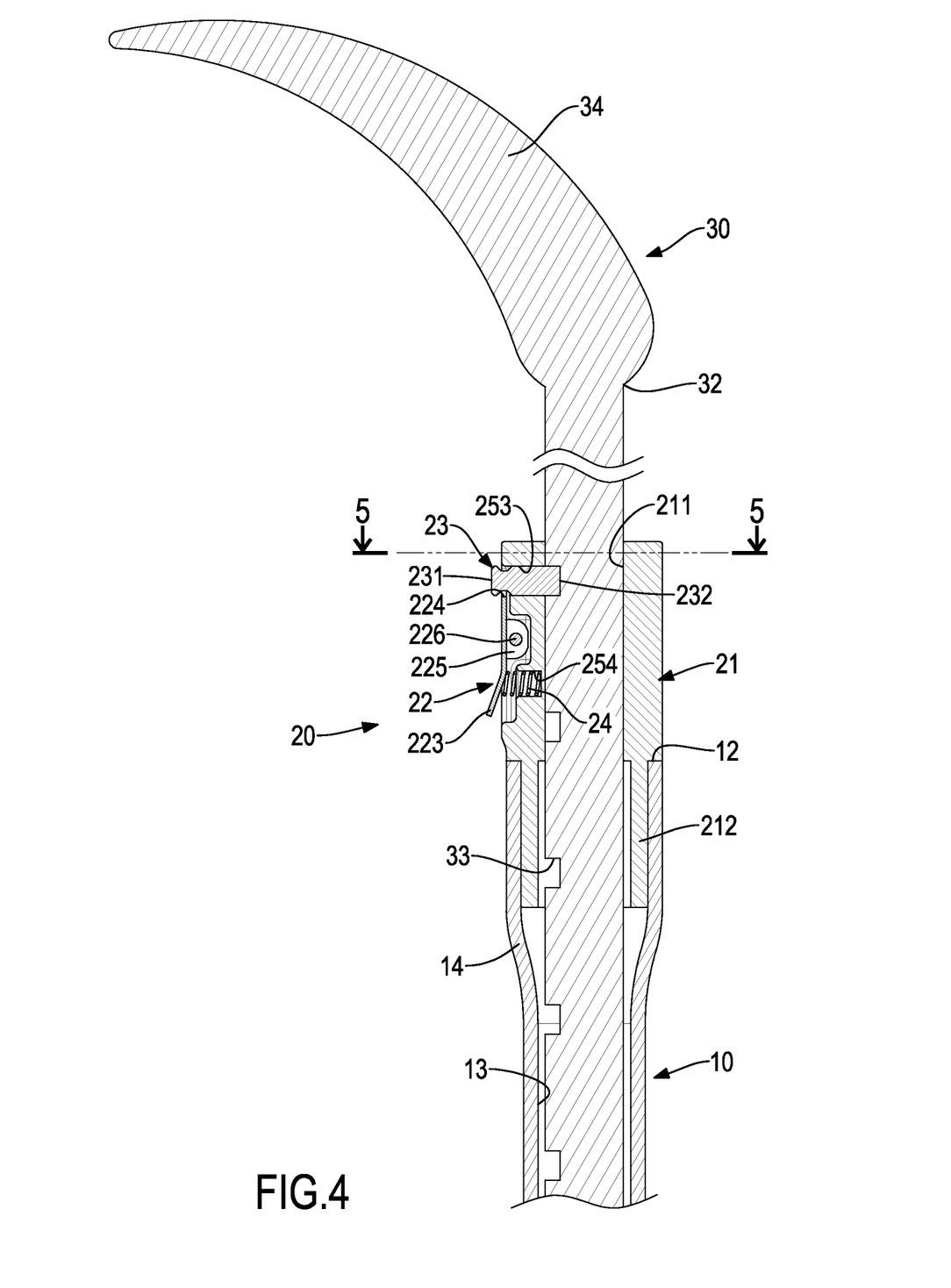
FIG. 4 is an enlarged and cross sectional side view of the telescopic crowbar in FIG. 1.
Figure 5:
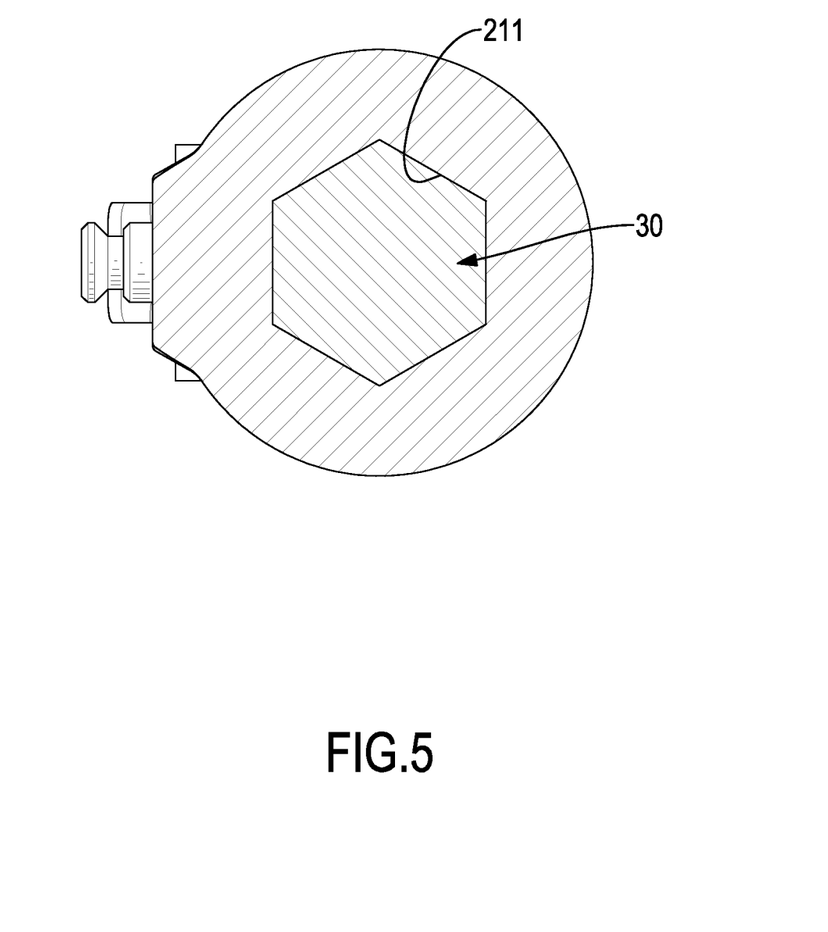
FIG. 5 is an enlarged and top side view of the telescopic crowbar along line 5-5 in FIG. 4.

Furthermore, with reference to FIG. 5, the extending rod 30 has a polygonal cross section, and the limiting recess 211 has an inner periphery corresponding to the polygonal cross section of the extending rod 30. Then the extending rod 30 can be moved along the limiting recess 211 without rotating. Preferably, the cross-section of the extending rod 30 is hexagonal, and the inner periphery of the limiting recess 211 is hexagonal corresponding to the cross section of the extending rod 30. Therefore, the extending rod 30 only can move relative to the adjusting module 20 and the mounting sleeve 10 without rotating relative to the adjusting module 20 and the mounting sleeve 10. Additionally, the extending rod 30 has multiple said positioning recesses 33 formed on the external surface of the extending rod 30 at spaced intervals. Consequently, the position of the extending rod 30 relative to the mounting sleeve 10 can be adjusted to adjust the total length of the telescopic crowbar according to the user's need. Preferably, each positioning recess 33 is transversally formed in one of multiple polygonal outer edges of the extending rod 30 and extends to another two of the multiple polygonal outer edges of the extending rod 30 adjacent to the corresponding polygonal outer edge.

Figure 6:
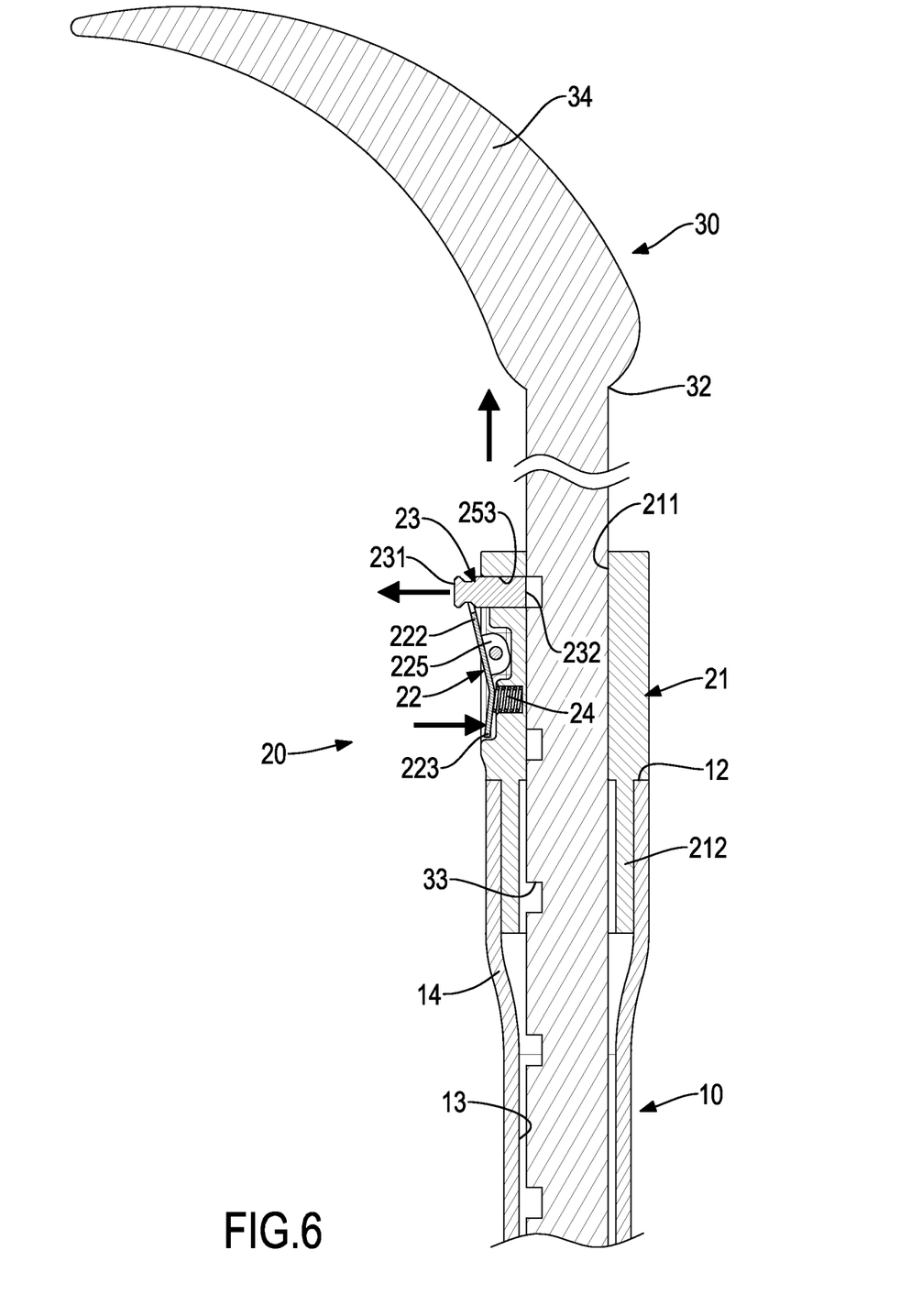
FIG. 6 is an enlarged and operational cross sectional side view of the telescopic crowbar in FIG. 1.
Figure 7:
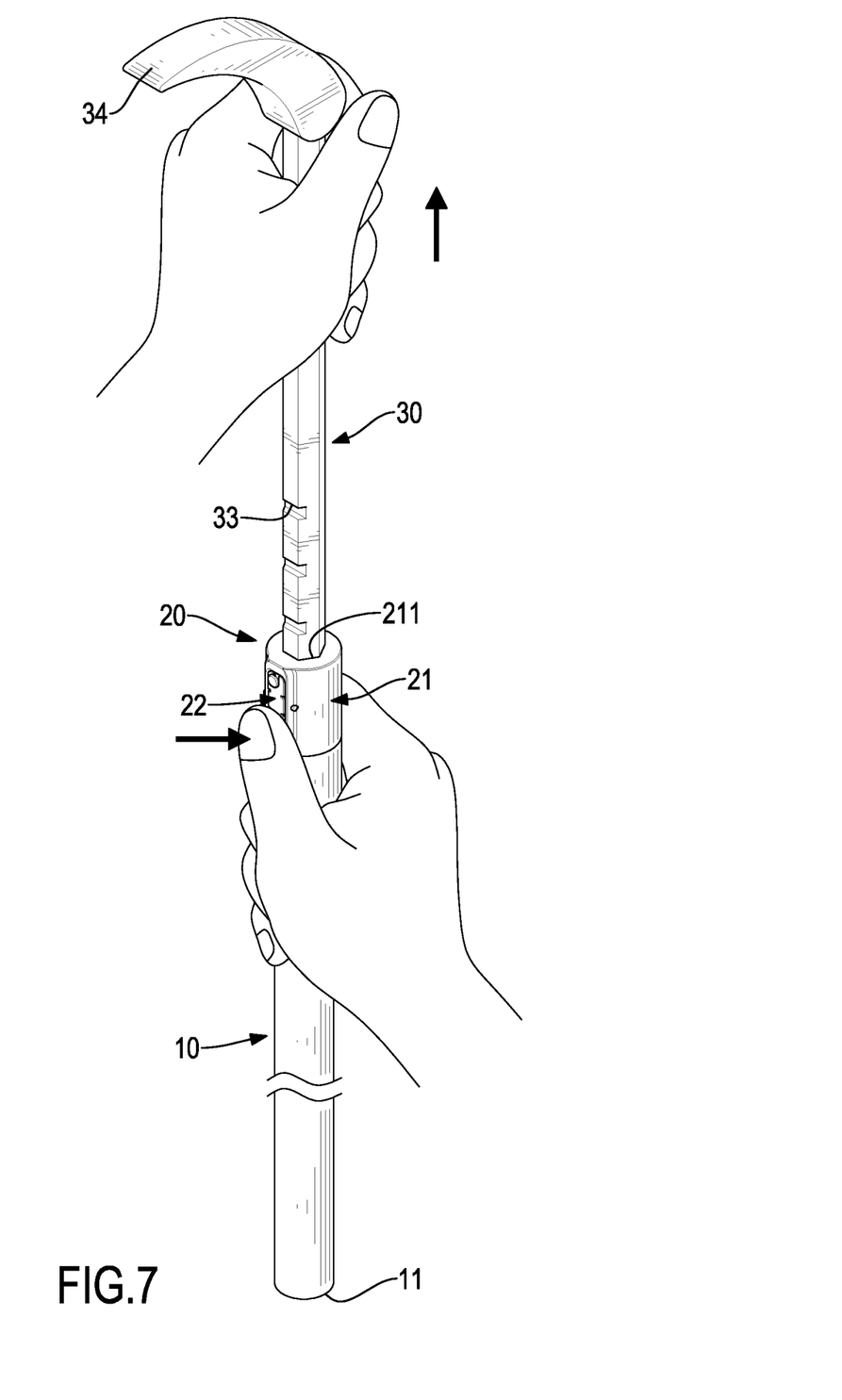
FIG. 7 is an operational perspective view of the telescopic crowbar in FIG. 6.

With reference to FIG. 6, when the telescopic crowbar of the present invention is in use, the user can hold the holding portion 14 and press the pressing end 223 of the pressing element 22 with one hand, the holding end 22 of the pressing element 22 moves away from the body 21 with the pivot portion 221 as a fulcrum to radially move the engaging element 23 relative to the extending rod 30 and the body 21, and the engaging element 23 disengages from a corresponding one of the at least two positioning recesses 33. Then, with reference to FIG. 7, the extending rod 30 is not limited by the engaging element 23 and can be moved axially relative to the mounting sleeve 10 and the body 21. The total length of the telescopic crowbar can be adjusted by a length of the extending rod 30 extended out of the mounting sleeve 10. Therefore, the user can separate two combined objects or remove nails at different distances or locations according to the user's need by adjusting the total length of the telescopic crowbar of the present invention without buying or carrying crowbars of different sizes, the cost of using the crowbars can be reduced and the practicability of the telescopic crowbar can be improved.

Figure 8:
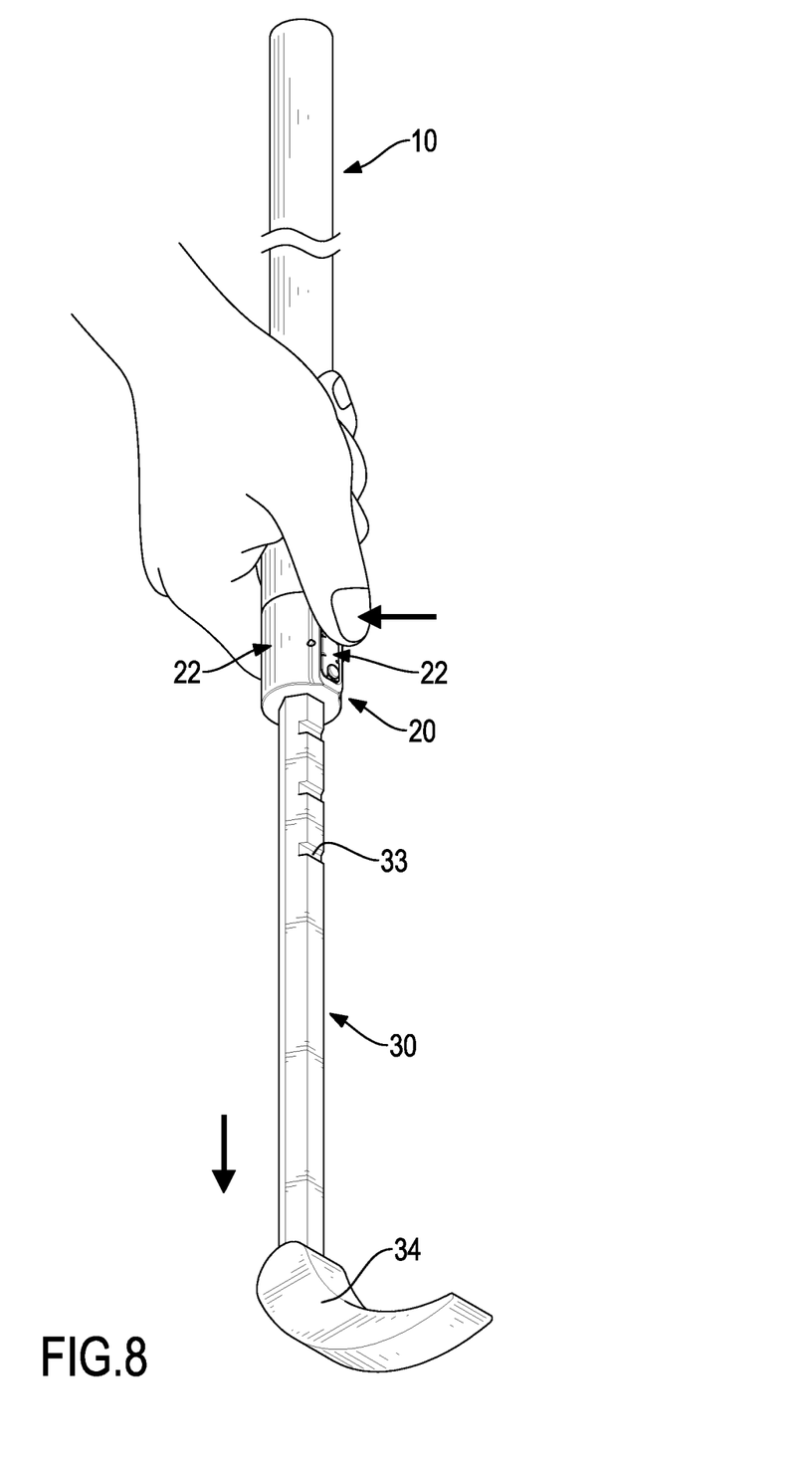
FIG. 8 is another operational perspective view of the telescopic crowbar in FIG. 6.

In addition, with reference to FIG. 8, after setting the telescopic crowbar of the present invention downward and pressing the pressing element 22, the extending rod 30 can move axially downward relative to the body 21 and the mounting sleeve 10 by the weight of the extending rod 30. When the extension rod 30 is moved to a desired length, releasing the pressing element 22, the compressed returning element 24 will push the pressing element 22 to return to an original position, allowing the engaging element 23 to move with the pressing element 22 radially toward the extending rod 30. Then the limiting end 232 of the engaging element 23 engages with another one of the at least two positioning recesses 33, the length adjustment of the telescopic crowbar is completed, and this is convenient and easy to use the telescopic crowbar of the present invention. Furthermore, the engagement between the limiting recess 211 and the extending rod 30 can provide a limiting effect to avoid the engaging element 23 without engaging with one of the at least two positioning recesses 33 after moving relative to the body 21 and the extending rod 30. Consequently, the present invention provides a telescopic crowbar that has a simple structure and can be used and adjusted easily.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A telescopic crowbar comprising:
a mounting sleeve having
a through end formed on one of two ends of the mounting sleeve;
a connecting end formed on the other one of the two ends of the mounting sleeve; and
a mounting recess formed in the mounting sleeve and communicating with the through end and the connecting end of the mounting sleeve;
an adjusting module connected to the mounting sleeve and having
a body connected to the connecting end of the mounting sleeve and having a limiting recess communicating with the mounting recess;
a pressing element swingably disposed on an external surface of the body;
an engaging element connected to the pressing element and extended into or out of the limiting recess of the body when the pressing element is swung relative to the body; and
a returning element disposed between the body and the pressing element; and
an extending rod engaging with the adjusting module, extended into the mounting sleeve, and having
an inserting end formed on one of two ends of the extending rod and extended into the mounting recess via the limiting recess and the connecting end of the body;
a working end formed on the other one of the two ends of the extending rod, disposed out of the mounting sleeve, and having a crowbar head; and
at least two positioning recesses formed on an external surface of the extending rod at a spaced interval between the inserting end and the working end of the extending rod;
wherein
the engaging element of the adjusting module selectively engages with one of the at least two positioning recesses via the limiting recess to hold the extending rod firmly on the mounting sleeve;
the extending rod has a polygonal cross section;
the limiting recess has an inner periphery corresponding to the polygonal cross section of the extending rod; and
the extending rod is moved along the limiting recess without rotating relative to the body and the mounting sleeve.

2. The telescopic crowbar as claimed in claim 1, wherein the pressing element has
a pivot portion formed on a middle of the pressing element and pivotally connected to the body;
a holding end formed on one of two ends of the pressing element; and
a pressing end formed on the other one of the two ends of the pressing element;
the holding end and the pressing end are moved toward or away from the body with the pivot portion as a fulcrum; and
the returning element abuts against the pressing end of the pressing element.

3. The telescopic crowbar as claimed in claim 2, wherein
the pivot portion of the pressing element has two pivot slices formed on the pivot portion at a spaced interval and faced to each other; and
the pressing element has
an engaging slot formed in the holding end; and
a pivot rod connected to the body and passed through the two pivot slices to hold the pressing element firmly on the external surface of the body.

4. The telescopic crowbar as claimed in claim 3, wherein the engaging element has an engaging end and a limiting end respectively formed on two ends of the engaging element, the engaging end engages with the pressing element in the engaging slot, and the limiting end extends into the limiting recess of the body.

5. The telescopic crowbar as claimed in claim 4, wherein
the body has a mounting seat formed on and protruded from the external surface of the body; and
the mounting seat has
a mounting slot formed in the mounting seat;
a pivot hole transversally formed through two outer sidewalls of the mounting seat and communicating with the mounting slot;
a through hole radially formed through the mounting seat and the body to communicate with the limiting recess; and
a storage recess formed in the mounting seat and communicating with the mounting slot;
the pivot rod of the pressing element extended through the two pivot slices and the pivot hole to hold the pressing element in the mounting slot of the mounting seat;
the limiting end of the engaging element extends into the limiting recess via the through hole of the mounting seat; and
the returning element is disposed in the storage recess of the mounting seat.

6. The telescopic crowbar as claimed in claim 1, wherein
the mounting sleeve has a holding portion being enlarged and formed on the mounting sleeve adjacent to the connecting end of the mounting sleeve; and
the mounting sleeve has an inner diameter at the connecting end of the mounting sleeve being larger than an inner diameter at the through end of the mounting sleeve.

7. The telescopic crowbar as claimed in claim 1, wherein each one of the at least two positioning recesses is transversally formed in one of multiple polygonal outer edges of the extending rod and extends to another two of the multiple polygonal outer edges of the extending rod adjacent to the corresponding polygonal outer edge.

8. The telescopic crowbar as claimed in claim 1, wherein the body has a connecting tube axially formed on and protruded from a lower end of the body, extended into the mounting recess, and securely connected to the connecting end of the mounting sleeve to connect the body securely to the connecting end of the mounting sleeve.

* * * * *